United States Patent [19]

Schomann

[11] 4,348,698

[45] Sep. 7, 1982

[54] MAGNETIC DEVICES FOR CHANGING VIDEO RECORDINGS

[75] Inventor: Klaus D. Schomann, Ludwigshafen, Fed. Rep. of Germany

[73] Assignee: BASF Aktiengesellschaft, Ludwigshafen, Fed. Rep. of Germany

[21] Appl. No.: 87,555

[22] Filed: Oct. 22, 1979

[30] Foreign Application Priority Data

Nov. 2, 1978 [DE] Fed. Rep. of Germany ....... 2847440

[51] Int. Cl.³ .............................................. H04N 5/78
[52] U.S. Cl. ........................................ 360/14; 360/24
[58] Field of Search ...................... 360/13, 14, 18, 19, 360/24, 33; 318/127

[56] References Cited

U.S. PATENT DOCUMENTS

| 3,223,790 | 12/1965 | Brandt | 360/90 |
|---|---|---|---|
| 3,427,398 | 2/1969 | Hemmerling et al. | 360/14 |
| 3,683,164 | 8/1972 | Minami | 360/13 X |
| 3,991,265 | 11/1976 | Fukuda et al. | 360/14 |
| 4,001,882 | 1/1977 | Fiori et al. | 360/14 |

FOREIGN PATENT DOCUMENTS

| 258043 | 8/1963 | Australia | 360/13 |
|---|---|---|---|
| 1063397 | 8/1959 | Fed. Rep. of Germany | 360/13 |
| 1071367 | 12/1959 | Fed. Rep. of Germany | . |
| 2457636 | 6/1976 | Fed. Rep. of Germany | . |
| 2653345 | 6/1978 | Fed. Rep. of Germany | . |
| 2852503 | 6/1979 | Fed. Rep. of Germany | . |
| 961951 | 10/1960 | United Kingdom | . |

OTHER PUBLICATIONS

SMPTE Journal, vol. 87, No. 8, (1978.08), pp. 504–507.

Primary Examiner—John H. Wolff
Assistant Examiner—Donald McElheny, Jr.
Attorney, Agent, or Firm—Keil & Witherspoon

[57] ABSTRACT

A method of changing video recordings with or without audio information on a single video recording/playback unit, comprising reading the originally recorded signals of a first of several tracks on a recording medium and re-recording said signals on the same first track or on a second track, as well as erasing the originally recorded signals, in order to vacate tracks for further new recordings, and devices for carrying out said method. The devices include recording/playback and erase head combinations, and a circuit for separating, changing and re-recording the video and/or audio signals.

9 Claims, 4 Drawing Figures

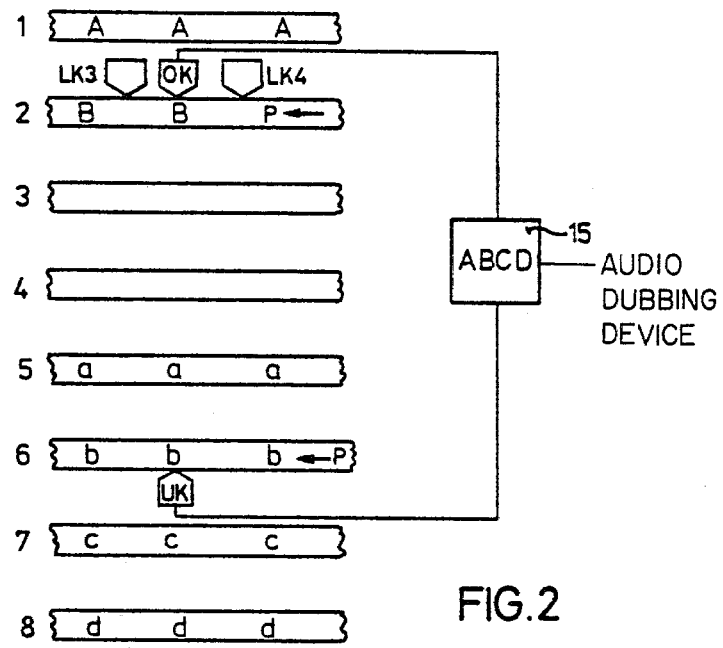
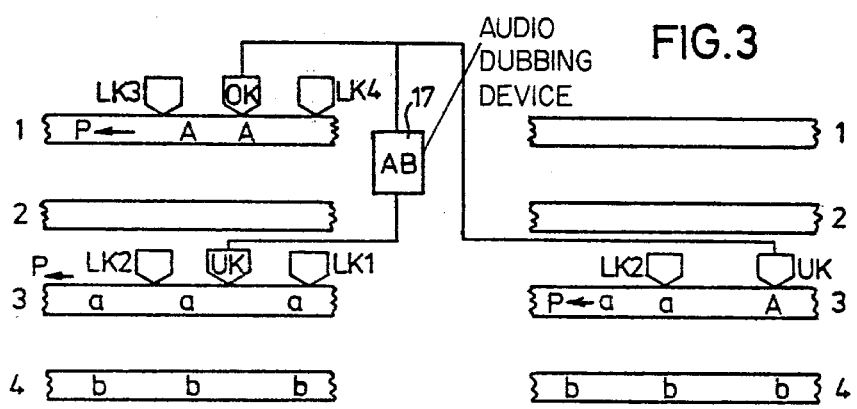

MAGNETIC DEVICES FOR CHANGING VIDEO RECORDINGS

BACKGROUND OF THE INVENTION AND PRIOR ART

The present invention relates to a method and devices for changing longitudinal video recordings with or without audio information in recording/playback systems employing recording media having parallel tracks, especially magnetic tracks, which contain originally recorded signals which can be read by means of a playback head and recorded by means of a recording head.

In the case of video tapes in which information is recorded on longitudinal tracks, it is possible to record sound on separate tracks or on the guard bands between the video tracks. However, if, for the purpose of making better use of the magnetic tape capacity or of avoiding disturbances, video and audio signals are combined and recorded on one magnetic track, subsequent modification of the audio information, without affecting the video information, can according to the prior art only be performed on a second video recorder.

German Published Application DAS 1,063,397 discloses, in connection with sound recordings, that an originally recorded audio signal, after scanning, can be mixed with a sound recording and recorded on a new track adjacent to the non-erased track carrying the original audio signal. For this purpose, twice the number of tracks and hence a large supply of tape is required. It is also known from German Published Application DAS 1,071,367 that, in the making of a sound recording, an additional recording can be accommodated on part of the track width of the first recording. In practice, this is effected by partly overwriting the first recording, using a smaller track width, or by using two fixed recording heads displaced relative to the track carrying the first recording, or by employing a single vertically displaceable recording head. Such an overwriting operation necessitates the separate recording of the video and audio signals on different tracks.

Furthermore, German Laid-Open Application DOS 2,457,636 discloses that audio information can be written over video information by means of a separate head having an inclined gap. Here, the difficulty is to separate the video and audio signals satisfactorily from one another during playback.

OBJECTS AND SUMMARY OF THE INVENTION

An object of the present invention is to enable video signals to be altered or sound signals to be added to video signals on a single video recording/playback unit, without a substantial loss of tape capacity.

This object is achieved by a method of changing video recordings with or without audio information in recording/playback systems employing recording media with parallel magnetic tracks containing the originally recorded signals which can be read by a playback head and recorded by means of a recording head, wherein the signals of a magnetic track are read, changed and re-recorded; such re-recording being made on the same magnetic track or on one of the other parallel magnetic tracks, and the originally recorded signals are erased after the re-recording operation, in order to vacate the magnetic track for further new recordings.

In one device for carrying out the method of the invention, in one and the same video recording/playback unit at least one playback head is allocated to one magnetic track with the originally recorded signals, and a recording head is allocated to the other magnetic track for the new recording, and there is also provided at least one erase head for erasing the previously recorded signals after the re-recording operation.

Special advantages are offered by the method of the invention for subsequently adding sound to video and audio information recorded in longitudinal tracks on magnetic tape. Depending upon the particular embodiment, at least one track is to be held vacant for the first re-recording, in case the original recording is cancelled directly after the transfer of information. However, it is also possible to hold several tracks vacant, so that only 4 to 8% of the total number of tracks are lost for the subsequent recording of sound. Apart from the simple subsequent addition of sound, the method and devices of the invention also make possible arbitrary manipulation of the existing audio signal, for example by reverberation effects, intentional distortion, playback and other trick measures known in audio engineering.

In another embodiment of the method of the invention it is possible, after re-recording on another magnetic track, to reproduce the new recording again and, after erasing the originally recorded signals, to make a re-recording on the first magnetic track. The newly recorded signals can thus be transferred to the same track that carried the originally recorded signals, it also being possible to check the transfer operation at the same time. The other magnetic track may be the adjacent magnetic track or the next track but one, or it may be expedient to use a track for the new recording, which is at a distance of several tracks from the original track.

Furthermore, it may be desirable to separate the audio information, contained in the signal being read, from the video information, to change the signal by the addition or omission of parts of the audio signal, to recombine it with the video information and to re-record it together therewith. It is thus possible to modify the audio signal only, whilst the video signal remains unchanged.

In yet another embodiment of the method of the invention, the originally recorded signals are erased after having been read. Rapid transfer or re-recording is thus made possible, although the advantage of a check on the transfer operation is lost.

In another variant, the originally recorded signals are only erased after the re-recorded signals have been read. This has the advantage that the result, i.e. the new recording, can be checked before the original information is cancelled, and that the transfer of information, with or without modification, from one track to the other can be repeated.

The device of the invention can be further modified by allocating a combined recording/playback magnetic head to each of the magnetic tracks, as a result of which the transfer of information from one track to the other can be checked at any time.

In nother practical embodiment, in the playback channel of the device the video output of the means for separating the audio signal from the video signal is connected to means in the recording channel for combining the video and audio signals, preferably via a switch, and the output of a converter situated at the audio output of the means for separating the audio signal from the video signal is connectable, via the abovementioned switch if desired, to means for changing the audio signal, the latter means being connected to the means in the recording channel for combining the video signals and the audio signals to be re-recorded.

In this way, a video signal separated from the audio signal but otherwise unchanged may be passed to the recording channel for re-recording, using mainly those circuit elements which are already provided in the video recorder.

In yet another embodiment of the device of the invention, at least one of the recording heads has an erase head arranged on either side of it, so that the track concerned can be erased either after a reading or a re-recording operation.

In a further advantageous embodiment of the device, the recording/playback heads are arranged on axes at right angles to the surface of the tape and at right angles to the direction of tape travel, so that read and write operations can follow each other immediately.

Further details of the invention are disclosed in the following description of the embodiments illustrated in the accompanying drawings, in which

BRIEF DESCRIPTION OF THE DRAWINGS

FIG. 2 is a schematic diagram of a first sound re-recording means, 8 tracks being used by way of example, FIG. 3 is a schematic diagram of a second sound re-recording means.

DETAILED DESCRIPTION OF THE PREFERRED EMBODIMENTS

Figure 1:
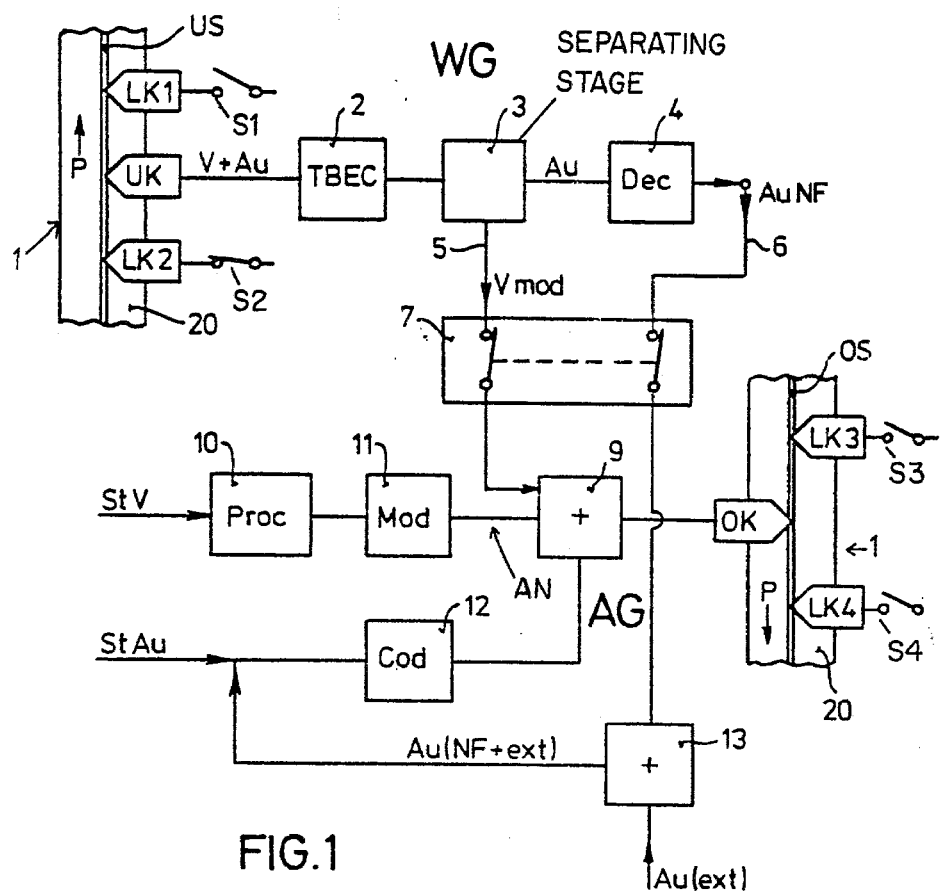
FIG. 1 shows a block diagram of a video recorder comprising the device of the invention for the subsequent recording/changing of audio signals.

A magnetic tape 1 carries longitudinal tracks, of which a lower track US and an upper track OS are shown. Magnetic heads are allocated to each of the two tracks, the playback head UK and the erase head LK2 being allocated to the track US, and thus being connected to the playback channel WG. Recording head OK and erase head LK4 are allocated to the track OS and are thus connected to the recording channel AG. Erase heads LK1 and LK3 are needed if provision is made in the system for tracks also running in the reverse direction. Switches S1 to S4 are allocated to erase heads LK1 to LK4, so that S1 switches head LK1, S2 head LK2, etc. The video recorder illustrated here may be of the high-speed type in which longitudinal tracks, for instance 48, are scanned parallel to one another, the tape travelling in opposite directions from one track to the next. However, any other type of longitudinal video recorder may be used for the sound re-recording method of the invention.

According to the present schematic diagram, the playback head scans the combined video and audio signal V and AU and passes it, possibly via a time base correction stage 2, to a separating stage 3 for the audio signal AU. Usually, combined video and audio signals recorded on one track are coded, and preferably modulated, in some way or another. In the present embodiment, frequency modulation is used for the luminance component of the video signal, and amplitude modulation for the chrominance component, the chrominance signal being transposed to a frequency below that of the luminance signal. The audio signal is frequency-modulated in accordance with the particular standard and its frequency transposed, for example, to a frequency below that of the chrominance signal. Consequently, the audio signal-separating stage may comprise a lowpass filter, at the output of which the audio signal, still frequency-modulated, is obtained, and a highpass filter, at the output of which appears the complete, still modulated color video signal $V_{mod}$. Whilst the audio signal AU is being further decoded in decoder 4, thus removing at least the FM modulation by a demodulating process, so that the demodulated audio signal AUNF is obtained at the output, the color video signal $V_{mod}$ is advantageously passed on unchanged.

Both signals $V_{mod}$ and AUNF are passed on parallel lines 5 and 6 respectively, from the playback channel WG to the recording channel AN of one and the same recorder. In the illustrated embodiment, lines 5 and 6 aare taken via a double switch 7, one directly and the other indirectly, to an adder 9 in the channel AN in which, during the normal recording operation, the standard color video signal StV in coded or modulated form is combined with the standard audio signal StAU. The double switch 7 may be in the form of suitable relays or other electronic switching elements controlled by means of operating keys on the recorder.

In the present system the signal StV, during a normal recording operation, passes through a signal processing stage 10, also referred to as a processor (proc), and thereafter through a modulating stage 11 which performs the required encoding process by way of AM and FM modulation. In the processor 10, the standard color video signal is decoded and brought to the desired bandwidth. The standard audio signal StAU also passes through a converter or encoder 12, in the present case a frequency converter stage, before the signal is supplied to adder 9. While the modulated color video signal $V_{mod}$ from the channel WG is taken to adder 9 at the video input, the separated audio signal AuNF from the playback channel WG is taken via a mixer 13 to the input of the converter or encoder 12. The mixer 13 may be a tape recorder for example, to which an external audio signal Auext is fed at another input, so that the composite signal Au(Nf+ext) becomes available at the output of mixer 13 and is directly fed to encoder 12, so that at adder 9 there is available an audio signal adapted to suit the recording system of the recorder, i.e. in the present system an FM-modulated audio signal below the bandwidth of the chrominance frequency. From the output of adder 9 the completely encoded color video and audio signals which are available at that point are fed to the magnetic recording head, in this case the head OK, which performs the re-recording operation. Obviously, the existing electronic recording circuitry of the recorder is utilized for the recording operation. For the sake of simplicity, circuit parts and components usually present in color video recording/playback apparatus are not described herein.

For the present invention it is of importance that the reproduction of the previously recorded signal and the recording of the modified signal should take place essentially simultaneously, unless storage devices for broad-band signals, excluding another video recorder, are available, such as an electronically clocked storage device. The abovementioned stage 2 for the time base correction of the complete video and audio signal may be dispensed with if no special demands on picture/sound synchronization are made.

Figure 4:
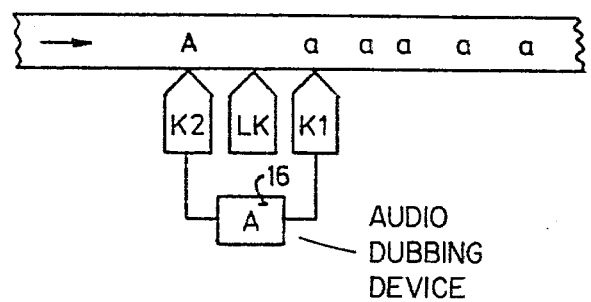
FIG. 4 is a schematic diagram of a third sound re-recording means.

In FIGS. 2 to 4, embodiments of the subsequent recording process are illustrated and will now be explained.

FIG. 2 is a schematic showing the signal transfer operation with reference to eight tracks. Tracks nos. 5 to 8 carry previously recorded video and audio signals a to d which are to be modified. In this embodiment, playback head UK scans track no. 6 on which signals b are recorded. Via the audio modification device 15 in which signals a, b, c, d are converted into modified video and audio signals A, B, C, D, the signals are re-recorded on one of the tracks nos. 1 to 4. In the illustrated embodiment, the recording head OK records signals B on track no. 2 after any previously recorded signals have been erased by means of erase head Lk4. Here, the tape is assumed to run in direction P, allocated to track no. 2, so that erase head Lk4 erases the track immediately before the recording operation.

In another embodiment of the invention, erase heads are not allocated to head OK, but to head UK, so that the scanned tracks are cleared after the scanning operation.

The first track to which signals are transferred in a re-recording process, i.e. track no. 5, still carries the previously recorded signals a which in this embodiment were not erased directly after the scanning operation. After re-recording, the modified video and audio signals A and B respectively are available on tracks nos. 1 and 2.

The signals of tracks nos. 5 to 8 may be transferred and re-recorded in the described order, so that signals c will be the next to be scanned, modified and re-recorded on track no. 3, shown still vacant in the drawing, in the form of signals C. The same can then be done with signals d. In the present embodiment, therefore, tracks nos. 1 to 4 have either been kept vacant from the beginning for the purpose of subsequent sound recording, or have contained unimportant erasable signals. However, it is also possible in principle to keep only one track, e.g. track no. 4, vacant and to transfer recording a from track no. 5 as recording A to track no. 4, then to transfer recording b from track no. 6 as recording B to track no. 5 after recording a has been erased and so forth, until recording z on track no. n has been transferred to track no. n−1 as recording Z. The heads UK and OK are arranged at a fixed distance above one another and can be moved across the width of the tape from track to track. FIG. 4 shows diagrammatically how the previously recorded signals a, after modification in stage 16, are re-recorded on the same track as signals A. For this purpose, head K1 is used as scanning head and head K2, arranged behind K1 in the direction of tape travel, is used as recording head. An erase head LK is advantageously arranged between the said two heads to clear the tape prior to recording.

FIG. 3 shows another embodiment of the method of the invention in which tracks nos. 1 to 4 are shown twice. The left-hand part of the drawing corresponds essentially to FIG. 2, also as regards function. Information a, previously recorded on track no. 3, is scanned by head UK, modified in a signal-changing stage 17 and re-recorded as recording A on adjacent track no. 1 (allocated the same direction of tape travel) where it is however only stored temporarily. Recording head OK, which can advantageously also be used as a scanning head, scans signals A and transfers them to track no. 3 via head UK which can advantageously also be used as a recording head, after track no. 3 has been erased, the latter operation being performed by means of LK2 either immediately after scanning of the signals a, or by means of LK4 prior to recording of signals A. The heads OK and UK are combined recording/playback heads, head OK being fixedly allocated to track no. 1 and head UK being movable over the other tracks. After signals A on track no. 1 have been scanned, they can be erased by erase head LK3.

In a video recorder capable of recording in two directions, it is advantageous to provide an erase head on either side of the magnetic heads, as shown in the drawings. Switch 7 in FIG. 1 is shown in the position for sound re-recording.

In the above described first embodiment of the invention, n minus 4 tracks carry re-recorded sound and 4 tracks are vacant after re-recording is complete. For n=48, this corresponds to 8% of the recording capacity.

In a further development of the above-described embodiment of the method of the invention, it is also possible to provide a "monitor reading step" or a "monitoring" mode. If erase head LK4 is arranged ahead of head OK, when viewed in the direction of tape travel, the following operation is also feasible:

Signals previously recorded by means of head UK are present on tracks nos. 5 to 48 of a magnetic tape on a recorder employing high tape transport speeds. The re-recording of sound is then carried out in the following manner:

The signals a to d are scanned by means of head UK, the modified signals A to D are re-recorded by means of head OK on tracks nos. 1 to 4, erase head LK4, arranged ahead of OK, being activated and erasing the relevant track. After the 4 tracks have been transferred (which takes 10 minutes if one track length takes 2.6 minutes to run through) the tape transport is stopped. The user now has the choice of continuing to modify the sound recording or of monitoring the information on the newly recorded tracks before erasing the original signals a to d. If the "monitoring" mode is used, the head assembly comprising heads UK and OK and the erase heads must be moved back by 4 tracks, so that tracks nos. 1 to 4 can be read by means of head OK. If the user is not satisified with the first re-recording, the sound modifying process is repeated by scanning track no. 5 by means of head UK, erasing the signals of the first re-recording by means of head LK4 and by re-recording the signals A to D by means of head OK.

It is also possible to switch the functions of the magnetic heads and to re-record the previously modified signals a second time, although the quality of the recording then distinctly suffers. Briefly, the procedural steps are as follows:

Re-recording

Scan a by means of UK, activate erase head LK4 to effect erasure, record modified signal A by means of OK (after swapping the functions of UK and OK);

Scan A by means of OK, erase original signal a by means of LK1, and record modified signal A' by means of UK.

By correctly switching the erase heads on and off as regards time and function, it is possible to monitor the transferred information and to make any necessary corrections between the signal transfer operations.

The following advantages accrue from the abovedescribed embodiments of the method of the invention:

In a video recorder without special sound re-recording facilities, the tape capacity is reduced only slightly, e.g. by only 8% in the case of a total of 48 tracks and a distance of 4 tracks between magnetic heads UK and OK, or by only 2.5% for a total of 72 tracks and a distance of 2 tracks between UK and OK.

Unlike all known sound re-recording methods, the method of the invention requires only a single video recorder, and this is also true in the case of video recorders with rotating magnetic heads.

Manipulation of the audio signal in all kinds of ways can be effected, such as reverberation, distortion, adding new sound or re-recording existing sound.

In principle, manipulation of the video signal is conceivable, but this would necessitate interposing synchronizing devices between the video recorder and the additional source of video signals.

Essentially, the electronic components already present in the recorder can be used, provided they are so designed that they can be specially interconnected.

The demands made on the magnetic heads are no greater than in conventional video equipment. There are no cross-talk problems because both heads carry the same video signal and their audio signals do not interfere with each other, so that the distance between heads is not critical.

I claim:

1. In a video recording/playback system having recording and playback heads for recording signals on, and playing signals back from, a recording medium having a plurality of parallel tracks,
   a method for audio-dubbing in a single recording/playback unit, the originally recorded signals, which last-mentioned signals have been recorded in modulated form, with an existing audio component, on a first of said tracks, said method comprising:
   playing the modulated signals back from said first track,
   separating the audio component of the played back signal from the undemodulated video component of said signal,
   demodulating the separated audio component for reducing said audio component to base band,
   providing at audio base band an audio signal to be dubbed in,
   combining the audio component reduced to base band and the base band audio signal to be dubbed in, and encoding the audio combination,
   combining the encoded audio combination with said undemodulated video component,
   rerecording the combined video and audio signal on a second of said plurality of tracks, and
   erasing said originally recorded signals after at least temporary rerecording, in order to vacate said first track for further new recordings.

2. In a video recording/playback system, an audio-dubbing method as claimed in claim 4, in which the second track is the next track but one of said plurality of tracks, said next but one track having the same direction of travel as said first track.

3. In a video recording/playback system, an audio-dubbing method as claimed in claim 1, in which said erasing step includes erasing said originally recorded signals immediately after the scanning of said originally recorded signals.

4. In a video recording/playback system, an audio-dubbing method as claimed in claim 1, in which said rerecording step includes, first, rerecording said combined video and audio signal on said second track, then reproducing the thus rerecorded signal, and then, after erasing said originally recorded signal, rerecording the reproduced signal on said first track.

5. In a video recording/playback system, an audio-dubbing method as claimed in claim 4, in which said erasing step includes erasing said originally recorded signals incident to the scanning of said initially rerecorded signals.

6. In a single video recording/playback unit with recording and playback channels having magnetic heads for recording signals on, and playing signals back from, a magnetic recording medium having a plurality of parallel tracks,
   apparatus for audio-dubbing the originally recorded signals in said single unit, the last-mentioned signals having been recorded in modulated form, with or without an existing audio component, on a predetermined one of said tracks, said apparatus comprising:
   in said playback channel
   a playback head for providing a played back signal,
   separating means for providing, at the audio output of said means, the audio component, if existing, of said played back signal and, at the video output of said means, the undemodulated video component of said played-back signal, and
   demodulating means connected to the audio output of said separating means for reducing said audio component to base band; and
   in said recording channel
   a sound source for providing a base band audio signal to be dubbed in,
   mixing means connected to the output of said demodulating means and also connected to said sound source for combining said audio component reduced to base band, and the base band audio signal to be dubbed in,
   encoding means connected to the output of said mixing means for modulating the last-mentioned output,
   adding means for combining the output of said encoding means with the un-demodulated video component derived from the video output of said separating means,
   a recording head for rerecording the combined modulated video and audio signal on an available one of said plurality of tracks; and
   said apparatus also comprising an erase head for erasing said originally recorded signals after the rerecording operation.

7. In a single video recording/playback unit, an apparatus as claimed in claim 6, in which said heads include a combined recording and playback head associated with each said first and second track.

8. In a single video recording/playback unit, an apparatus as claimed in claim 6, in which an erase head is disposed on either side, longitudinally of said recording medium, of the recording head for rerecording said combined signal so that the information on the last-mentioned one of said tracks may be erased before or after said rerecording.

9. In a video recording/playback system, an apparatus as claimed in claim 6, in which said apparatus includes first and second switching means, said first switching means being interposed between the audio component demodulating means and the corresponding input of said mixing means, and the second switching means being interposed between the video output of said separating means and the corresponding input of said adding means.

* * * * *